United States Patent [19]

Elzenbeck et al.

[11] Patent Number: 5,501,355
[45] Date of Patent: Mar. 26, 1996

[54] WORK-BOX

[76] Inventors: Manfred Elzenbeck, Klosterstr. 39-41, D-71711 Steinheim; Klaus Haar, Landhausstr. 3, D-71384 Weinstadt, both of Germany

[21] Appl. No.: 82,229

[22] Filed: Jun. 24, 1993

[51] Int. Cl.$^6$ .................................................. A47G 19/00
[52] U.S. Cl. ..................... 220/23.2; 220/23.83; 220/505; 220/523; 220/525; 220/337; 220/343; 220/771; 206/315.11; 206/372; 206/373
[58] Field of Search ................... 220/23.2, 23.6, 220/23.83, 505, 523, 524, 525, 337, 342, 343, 771; 206/315.11, 372, 373

[56] References Cited

U.S. PATENT DOCUMENTS

| | | | |
|---|---|---|---|
| 2,723,175 | 11/1955 | Berry | 206/315.11 |
| 3,050,356 | 8/1962 | Messmer | 206/315.11 |
| 3,713,529 | 1/1973 | Meksula | 206/373 X |
| 4,258,847 | 3/1981 | Nierman | 206/504 |
| 4,613,041 | 9/1986 | Carlton | 220/524 X |

*Primary Examiner*—Allan N. Shoap
*Assistant Examiner*—Stephen Cronin

[57] ABSTRACT

A work box comprises a central box unit and two lateral box units. Each of the box units has a bottom wall, a front end wall, a rear end wall, two opposing lateral side walls, and adjacent surfaces of complementary shape so that when the work-box is closed it forms an essentially solid block. Guide means of the work-box is arranged between the central box unit and the lateral box units, respectively. The bottom wall of the central box unit comprises downwardly inclined slanted wall portions, with the contour of the central box unit essentially corresponding to a triangular prism. The central box unit opens in an upward direction and has a lower edge defined by the slanted wall portions of its bottom wall, which faces in a downward direction. The upper edges of the front end, rear end, and side walls of the lateral box units define a plane that is parallel to the slanted wall portions of the central box unit.

17 Claims, 6 Drawing Sheets

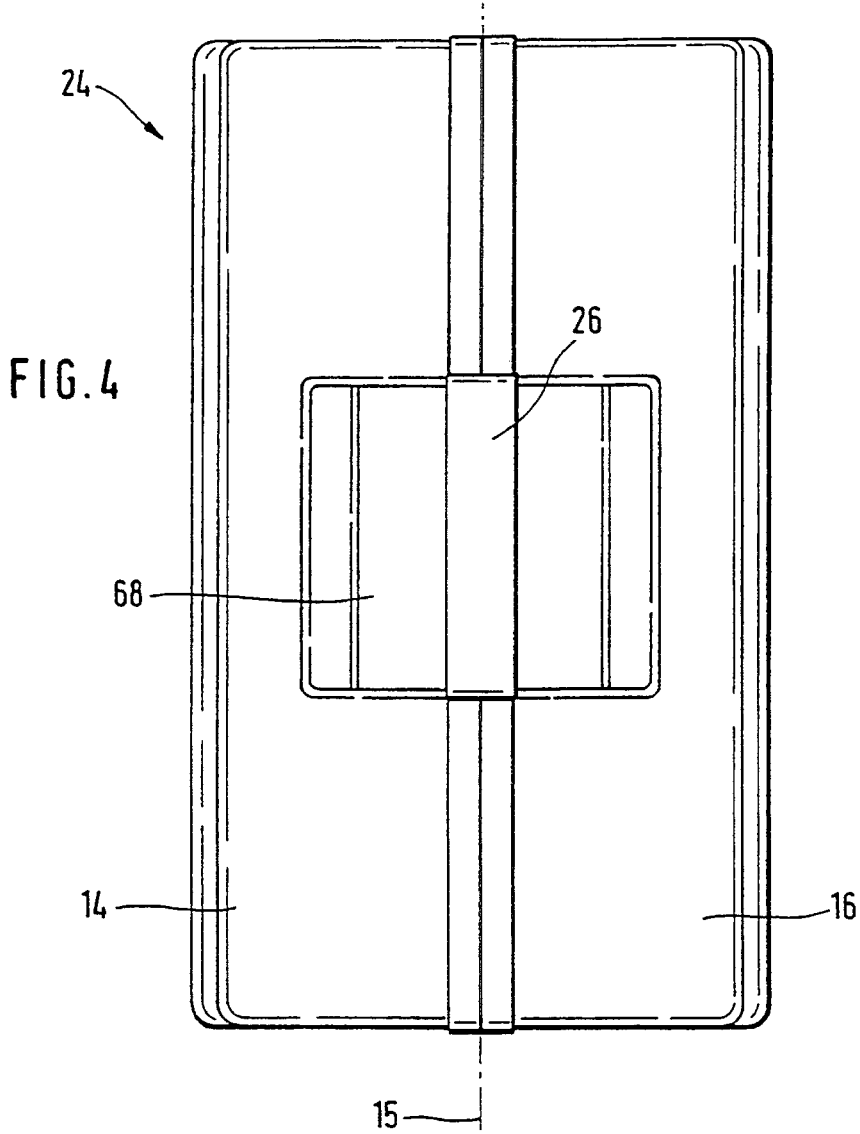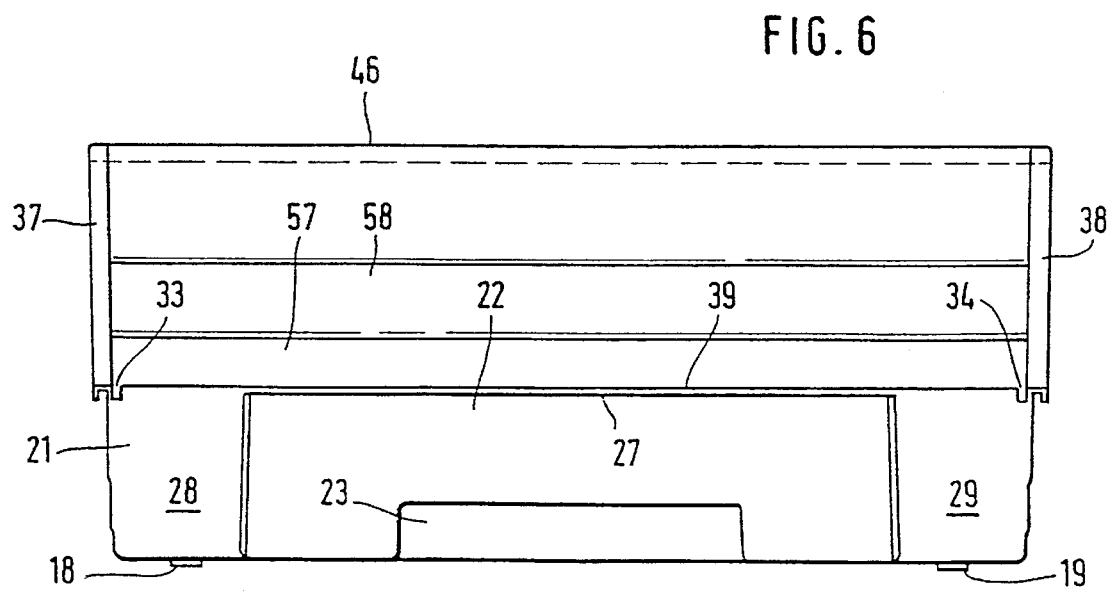

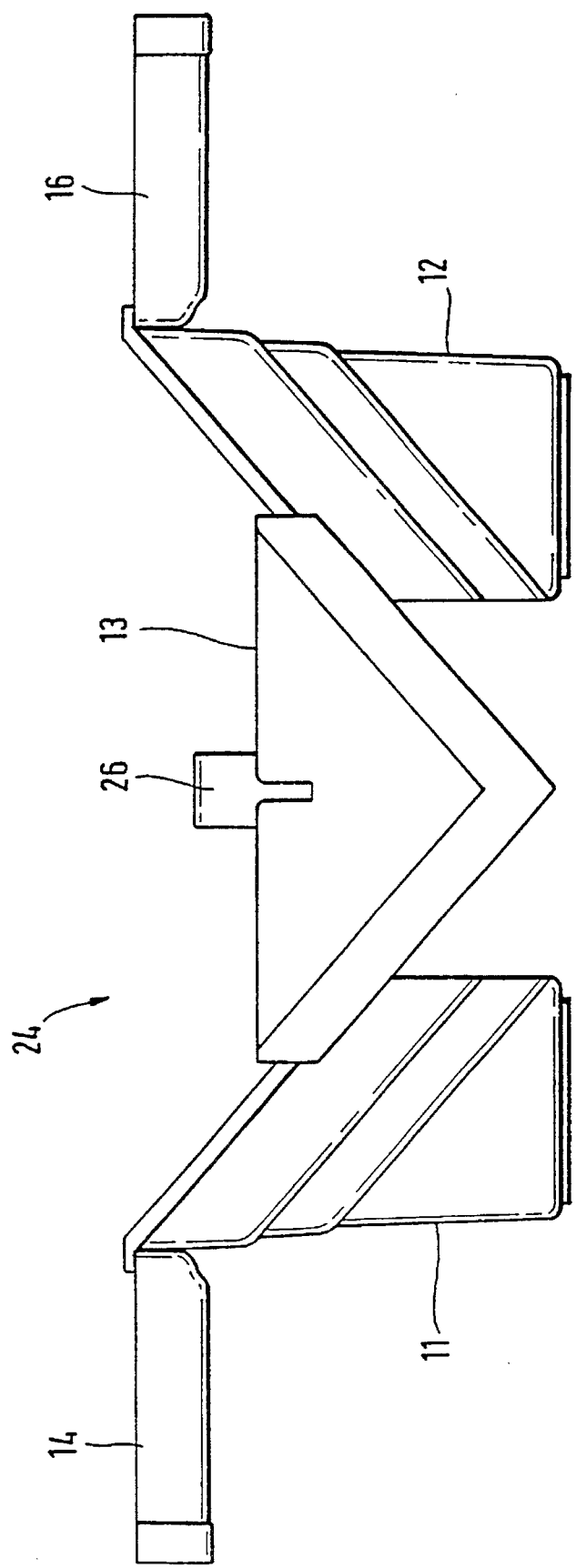

WORK-BOX

BACKGROUND OF THE INVENTION

1. Field of the Invention

The invention relates to a work-box.

2. Description of the Prior Art

Known work-boxes are complicated to produce, complicated in assembly, consist of very many parts, have an insufficient support surface, especially on uneven ground, when in the open state are less secure against tipping than when in the closed state, are expensive to produce, are unesthetic, and can become jammed while opening or closing. Insofar as they are of metal, they have to be lacquered, in spite of which they rust after a certain time, clatter, and are heavy. They have edges and corners because of their manner of production, and hence give rise to a danger of injury. Further disadvantages of the individual systems can be gleaned from the literature.

SUMMARY OF THE INVENTION

The present invention has as its object to provide a work-box which is improved over this, which can be completely or partially produced by plastics techniques, predominantly in an injection molding process and/or blow molding process, deep drawing process, etc. It is to be suitable for tools, angler's goods, painting goods, sewing goods, handicraft goods, and the like.

According to the invention, this object is achieved by means of a work-box comprising a central box unit and two lateral box units. Each of the box units has a bottom wall, a front end wall, a rear end wall, two opposing lateral side walls, and adjacent surfaces of complementary shape so that when the work-box is closed it forms an essentially solid block. Guide means are arranged between the central box unit and the lateral box units, respectively. The bottom wall of the central box unit comprises downwardly inclined slanted wall portions, with the contour of the central box unit essentially corresponding to a triangular prism. The central box unit opens in an upward direction and has a lower edge defined by the slanted wall portions of its bottom wall, which faces in a downward direction. The upper edges of the front end, rear end, and side walls of the lateral box units define a plane that is parallel to the slanted wall portions of the central box unit.

BRIEF DESCRIPTION OF THE DRAWINGS

The invention will now be described with reference to the accompanying drawings, in which:

FIG. 4 shows the plan view,

FIG. 6 shows a view, along the arrow 6 in FIG. 1, of the left pocket in FIG. 1, with hinged-on, opened lid, but without a prism, FIG. 9 shows a view like that of FIG. 3, but in the opened state.

DETAILED DESCRIPTION OF A PREFERRED EMBODIMENT

Figure 7:
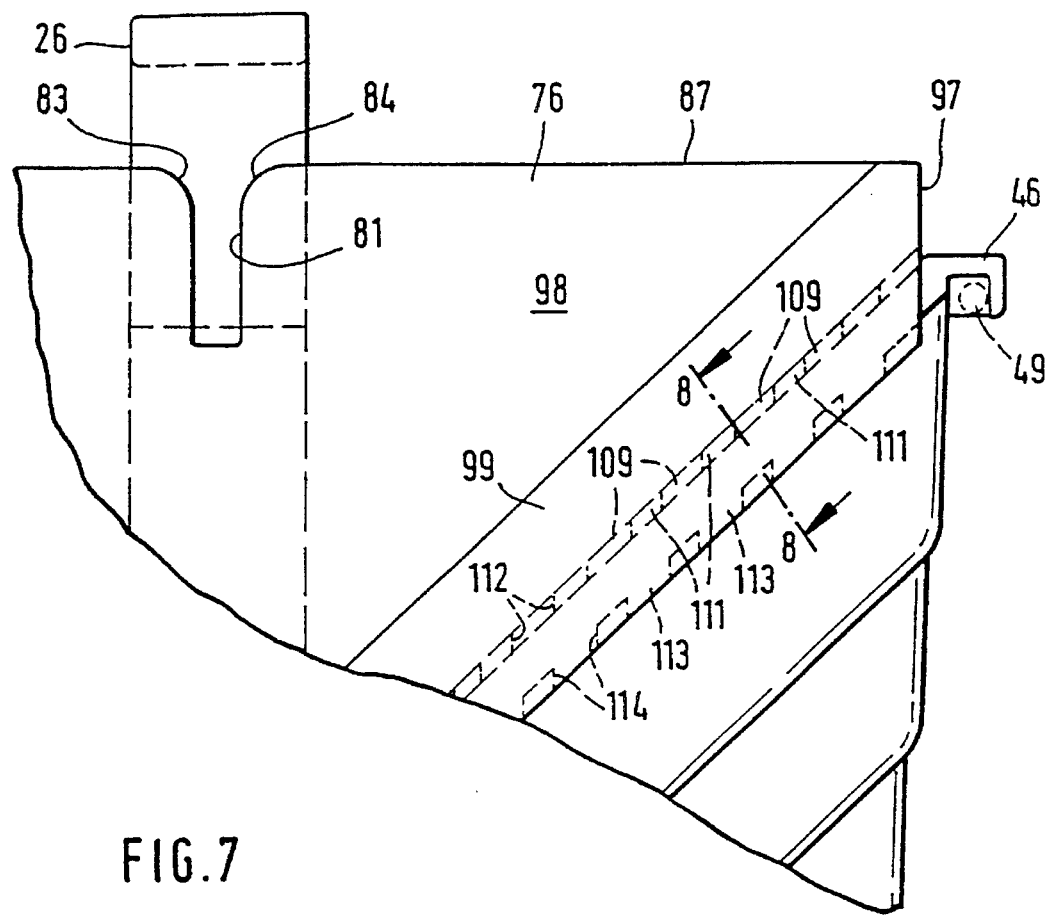
FIG. 7 shows a representation from the right-hand upper region of FIG. 3, but without a lid.
Figure 8:
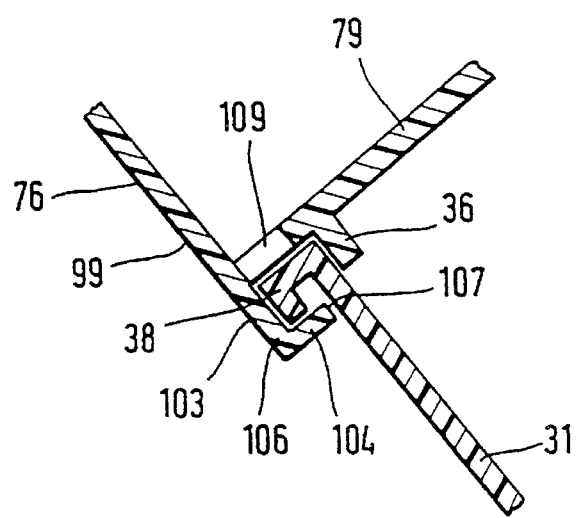
FIG. 8 shows a section along the line 8—8 in FIG. 7.

In the drawing, FIGS. 2–6 and 9 are to scale, FIG. 7 is on a scale of 1:1, and FIG. 8 is on a scale of 1:1.55.

Figure 1:
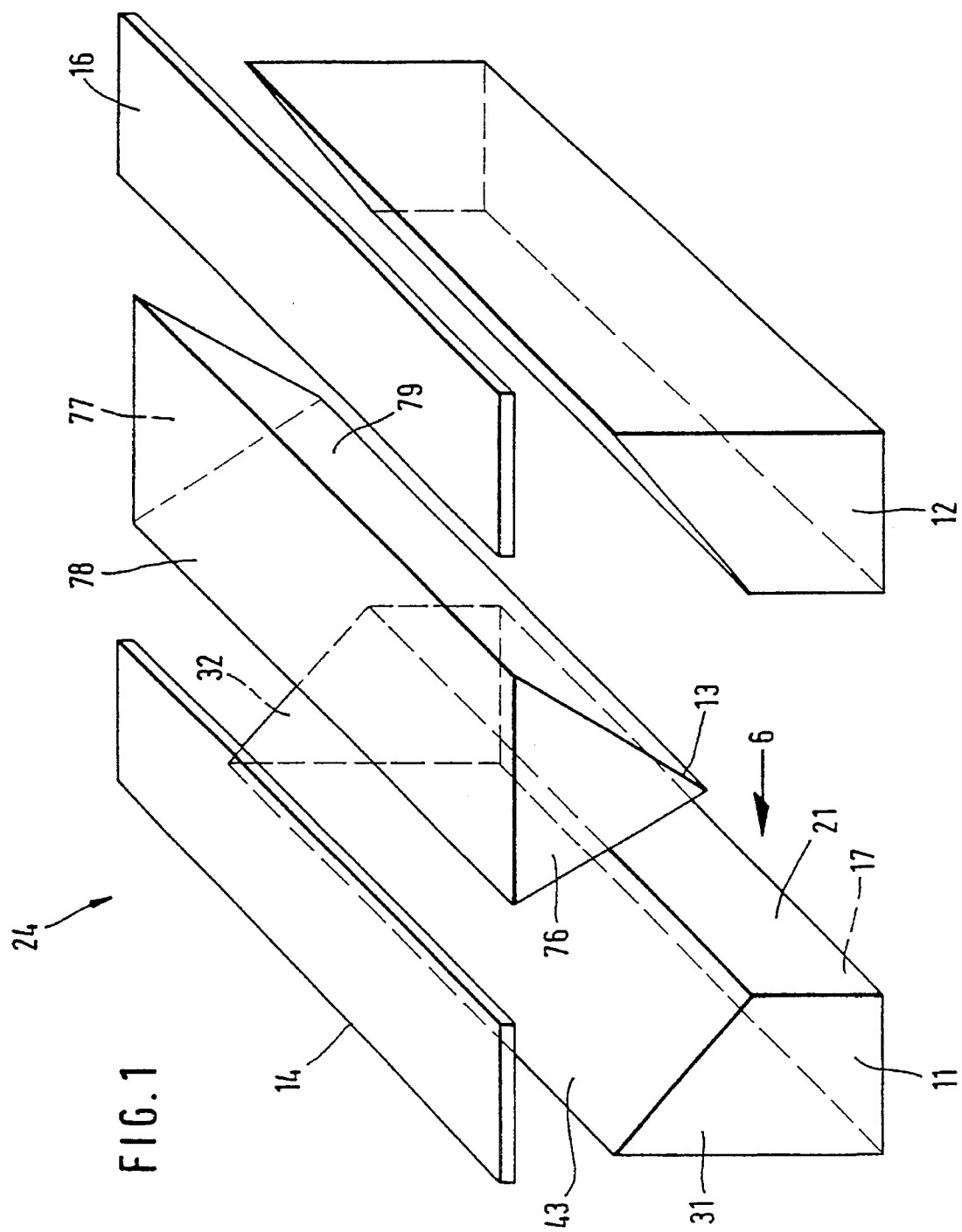
FIG. 1 shows parts of a work-box in an exploded representation, abstracted as geometrical figures.
Figure 2:
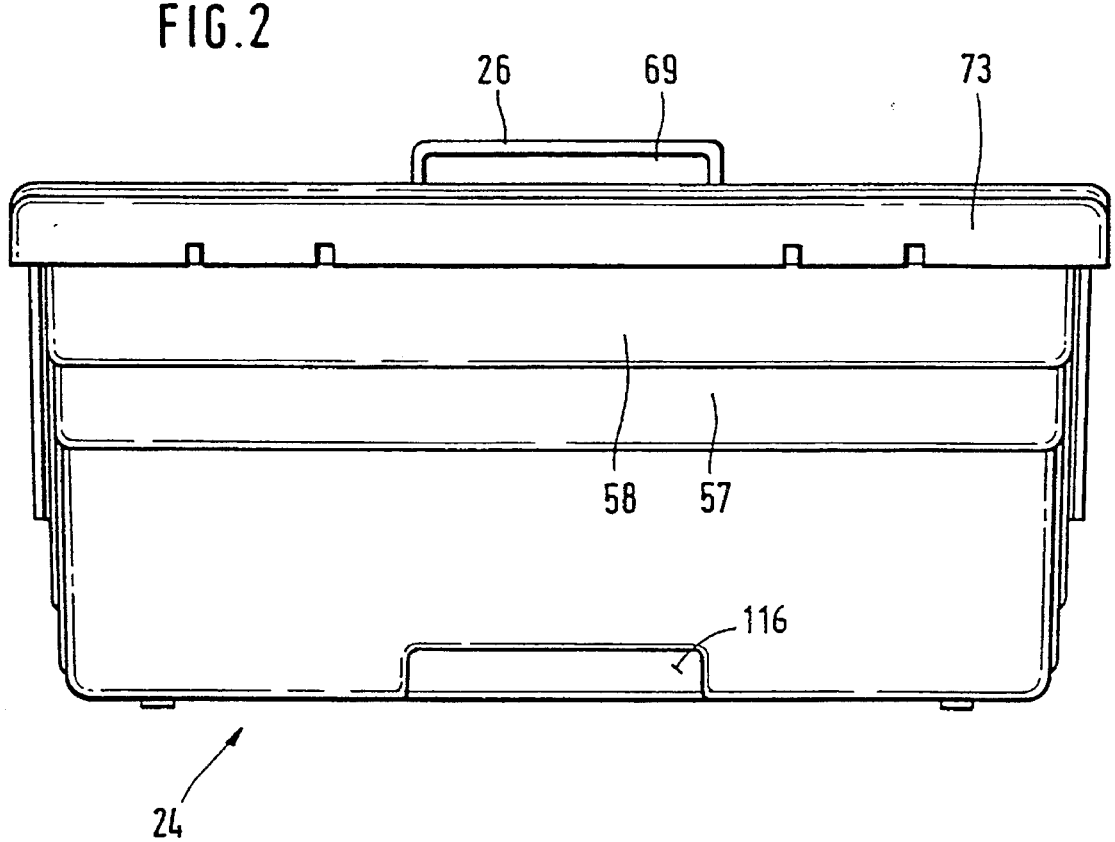
FIG. 2 shows the side view of the work-box.

According to FIG. 1, the invention includes a left-hand pocket 11, a right-hand pocket 12, a triangular prism 13, a left-hand lid 14 and a right-hand lid 16. 14 and 16 are identical. 11 and 12 are identical, at least in their essential shape. Therefore only 11, 13 and 14 will be described below and the other parts only to the extent that is necessary for an understanding of functioning.

Figure 3:
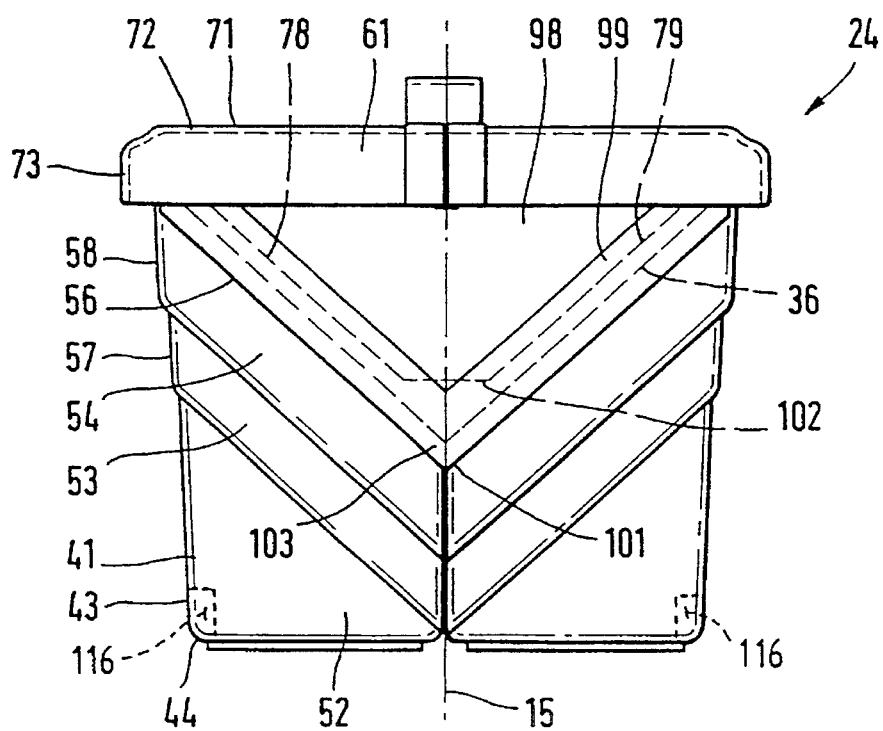
FIG. 3 shows a front view of the work-box.

There exists pronounced symmetry to a midplane 15, such as is drawn in FIGS. 3 and 4.

The left-hand pocket 11 has a flat floor 17 which has on its underside two slide rails 18 and 19 that project downwards and facilitate its sliding on rough ground. It has an inner wall 21, from which there goes inwards an recess 22 (as in FIG. 6), which is flat and reinforces this wall a little. A hollow 23 is provided centrally in the recess 22, is open downwards and can receive half of the upstanding part of a handle 26, for the purpose of stackability in the closed state of the toolbox 24. The hollow 23 also has a reinforcing function. A shoulder 27 is left standing out along the whole upper edge of the recess 22. Due to the recess 22, approximately rectangular surfaces 28, 29 are left standing out to right and left of it, so that the pockets 11, 12 in the closed state only contact each other in these regions. In the upper right-hand and left-hand corner regions, before the inner wall 21 merges into a front wall 31 and a rear wall 32, a respective recess 33, 34 is provided, open upwards at the edge, so that a ledge 36 of the prism 13 can run there. The upper edge of the front wall 31 and of the rear wall 32 merge at an angle of 42' to the horizontal into a U-profile 37, 38, which is open downwards, which forms a track half of a guide device, and which also reinforces the upper edge of the front wall 31 and of the rear wall 32. The U-profiles 37, 38 do not extend beyond the inner wall 21. The upper edge 39 of the inner wall 21 runs horizontally. The front wall 31 and the rear wall 32 merge with curvatures 41 into an outer wall 43, which merges at the bottom with a curvature 44 into the floor 17. As is shown in FIG. 3, the outer wall 43 runs outwards at an angle suitable for demolding, and thus does not stand perpendicularly to the floor 17, while at least the surfaces 28, 29 lie in the midplane 15. At its upper, horizontal edge, the outer wall 43 merges into a U-profile 46 which is open downwards and outwards and which reinforces the upper edge. Moreover two gaps 47, 48 are provided in the U-profile 46, and are bridged over by respective shafts 49, 51, both of which run horizontally. The front wall 31 is uneven insofar as, starting from a triangular region 52, at its upper edge a first strip 53 and out of this a somewhat still wider strip 54 project out forward, and at an angle in fact corresponding to that of the forward, left-hand edge 56 of the prism 13. Reinforcement and also an esthetic element thereby arise. The strips 53, 54 project horizontally into the outer wall 43 as strips 57, 58, reinforce this wall, form an esthetic element and facilitate demolding. The rear wall 32 appears correspondingly like the front wall 31.

Figure 5:
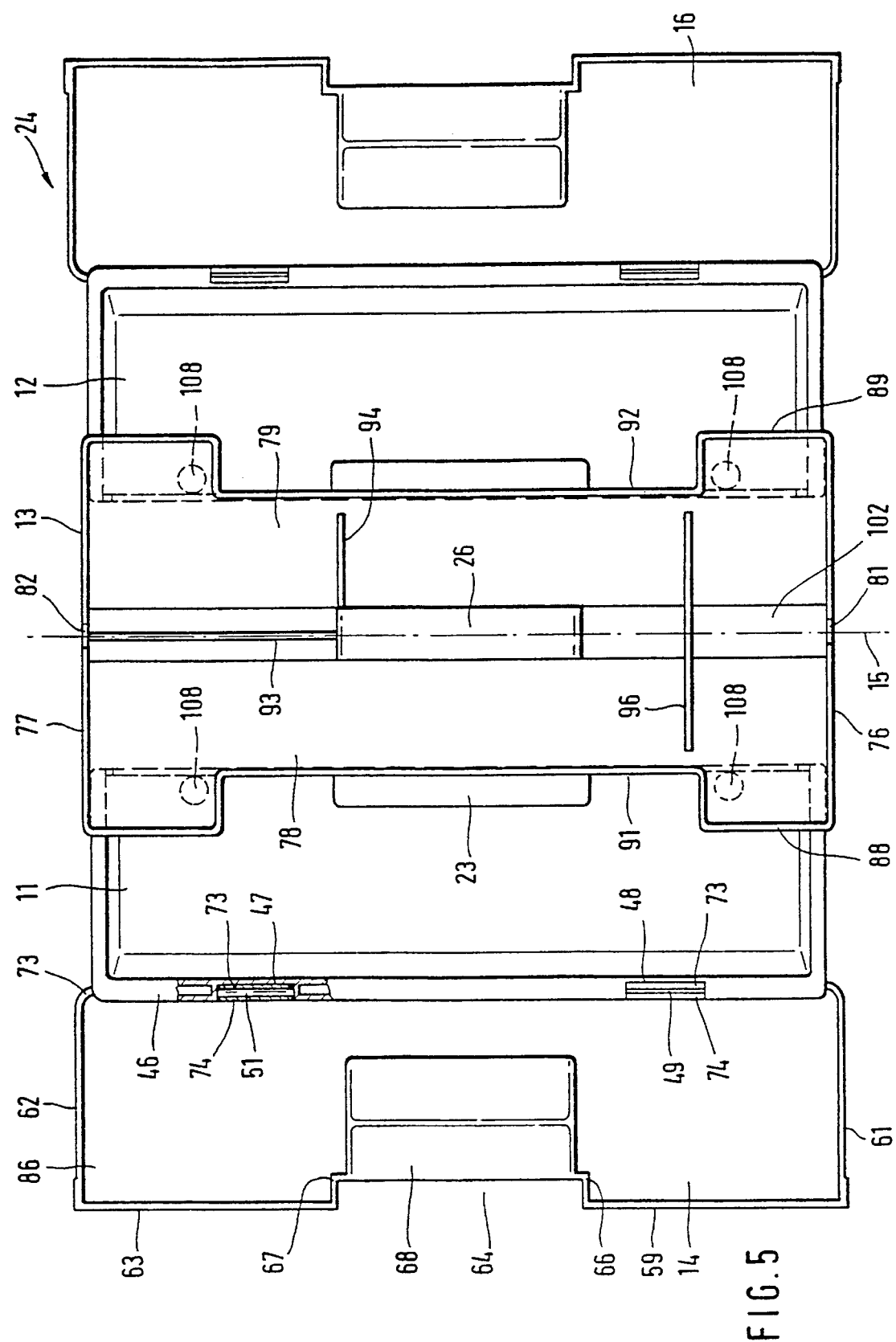
FIG. 5 shows a view like that of FIG. 4, but in the completely opened state of the work-box.

A lid 59 has a forward edge 61 and rear edge 62, which stand perpendicularly upwards in the opened state, an outer edge 63, according to FIG. 5, interrupted by a recess 64 which is formed by two wall corners 66, 67 which merge into a handle hollow 68 standing aside upwards according to FIG. 5. The recess 64 is so long that the handle 26 fits into it. The handle hollow 68 is of a depth such that it is possible to reach into the opening 69 of the handle 26, although this stands out only half over the surface 71 of the lid edge 72. In the folded-up state according to FIG. 5, the lid wall 72 forms a support surface which is bounded forward, rearward and outward by 61, 62, 63, 66, 67 and 68. Inwards according to FIG. 5, or outwards according to FIG. 3, a peripheral wall 73 extends perpendicularly downwards. In the opened state, the wall 73 lies with its upper region within the U-profile 46. In the region of the shafts 49, 51, the wall 73 is shaped such that, together with a counter-wall 74, it results in a kind of wide, resilient clamp like a clothes peg provided with grooving, the shaft 51 fitting between it, but which can spring apart for demounting. This springing out can only take place in that direction which is the plane of the drawing of FIG. 6. In a position according to FIG. 5, there is less room between the periphery of the shaft 51 and the outer surface of the outer wall 43 than the wall 73 is thick in this region.

The prism 13 is open upwards and has a front wall 76, a rear wall 77, a left sidewall 78 and a right sidewall 79. The sidewalls 78, 79 run at the angle complementary to 42'. A slot 81, 82, open upwards, is provided in the front wall 76 and rear wall 77, symmetrically to the geometric midplane 15; the outer edge 63 of the two lids 14, 16 engages in it in the closed state, thus ensuring that the two pockets 11, 12 cannot be separated from one another. In order for the outer edge 63 to locate better in the slots 81, 82, these have entry curvatures 83, 84. The inner surface 86 of the lid wall 72 abuts on the otherwise through horizontal edge 87 of the prism 13. The long edges 88, 89 of the prism have a recess 91, 92, which extends over approximately three quarters of the length of the prism, so that, according to FIG. 5, there is unhindered access to the deeperlying regions of the pockets 11, 12. The opening 69 is extended to halfway under the edge 87, but not lower than the handle hollow 68, so that in the closed state of the toolbox 24 the handle 26 closes the recesses 64 of both lids 14, 18 upwards. As seen from FIG. 4, the contour of the handle 26 has the same rectangular shape as the recesses 64 in the closed state. A half-height partition 93 lying in the plane 15 is provided upwards from the handle 26, according to FIG. 5. A crosswall 94 goes out from the lower region of the handle 29, is integral with the sidewall 79 and additionally reinforces this. According to FIG. 5, a completely through-crosswall 96 is provided under the handle 26 and in fact at the height of the lower beginning of the recesses 91, 92. Thus four mutually separate compartments arise. The upper edges of 93, 94 and 96 lie at the same height, so that organizer boxes matching this one can be placed hereon which have a shape complementary to the interior of the prism 13, and thus cannot slip askew. Moreover the upper edge of the organizer boxes reaches as far as the height of the edge 87, so that the organizer boxes also are closed upwards by the lids 14, 16.

As can be seen from FIG. 7, the edge 87 lies above U-profile 46 in the closed state. The right-hand, perpendicular edge 97 according to FIG. 7 lets the U-profile 46 emerge freely towards the right. The front wall 76 has a V-shaped strip 99 set back a few millimeters relative to the triangular field 98 and tapering downwards to a point 101. The sidewalls 78, 79 do not meet at an acute angle; FIG. 1 allows this to be assumed. Furthermore they abut with a narrow, strip-shaped, horizontal floor 102, as shown in FIG. 3 and 5. The V-shaped strip 99 merges via the sidewalls 78, 79 and the strip 102 into an apron 103. This apron merges at its outer end into a ledge 104 which runs parallel to the sidewall 79 (and in the region not shown, parallel to the sidewall 78). The L-track 106 thus formed guides the U-profile 38 of the pocket 12. This guidance is provided, of course, uniformly twice forwards and twice rearwards. A parallel guidance thus results, so that the prism 13 can be moved from its position shown in FIG. 3 into its deepest position, shown in FIG. 5, with the pockets 11, 12 being remote from each other at the maximum distance. The play necessary for this is here provided according to FIG. 8. The end face 107 of the ledge 104 ends before the front wall 31. Behind the rear wall 31, there is provided on the sidewall 79 the ledge 36 which has already been mentioned, so that a further reinforcement and also a guide for the U-profile 38 are also provided here. In a more economical embodiment, the ledge 36 only needs to be provided in that region in which the apron 103 overlaps the front wall in the state shown in FIG. 5. In FIG. 3, the length of the ledge 36 is shown dashed along its length.

Projections 108 are provided on the outer surface of the sidewalls 78, 79 where the recess 91, 92 has not yet begun; they are flat, and in the position shown in FIG. 5 are seated on the upper edge of the respective pocket 11, 12 and prevent the prism sliding too far downwards. If it is desired to mount 11, 12 and 13, these projections have a slide-on flank in the mounting direction, i.e. from below to above in FIG. 1, so that the slide-on flank can travel over the upper edges 39. In the other direction, however, the projection 108 can be supported on the upper edges 39, so that the deepest position of the prism 13 is determined.

As is apparent from the description and the drawing, the lids 14, 16 can be demolded from a two-part tool, in that this is moved perpendicularly of the main plane of these parts. The pockets 11, 12 can also be produced with a single, two-part injection molding tool without a mold slide, in that this tool is moved essentially perpendicularly of the floors 17 of the pockets 11, 12.

In spite of the L-tracks 6, the prism 13 can however also be demolded by a two-part tool without a mold slide, and in fact by a motion of at least one mold half along the geometrical midplane 15, proceeding as shown in FIGS. 7 and 8, which is clarified by the regions shown there: windows 109 are provided in the sidewall 79, and are relatively short, leaving webs 111 between them. Here the walls 102 of these windows 109 run parallel to the geometrical midplane 15.

Exactly the same arrangement, but displaced by a division, is provided in the ledge 104. Its windows lie opposite the webs 111 and the corresponding walls 114 likewise run parallel to the midplane 15. Even when the pockets 11, 12 stand up differently, the work-box 24 has a secure standing position.

After the lids 14, 16 are opened, the work-box 24 can indeed be brought per se into the position shown in FIG. 9. e.g., by pressure on the handle 26 from above. In case this is not possible, e.g. on account of friction or other circumstances, bottom/outer handle grooves 116 are provided, which are only shown in FIGS. 2 and 3, but were omitted from FIGS. 5 and 9 for the sake of a simpler drawing.

We claim:

1. A work-box comprising a) a central box unit and two lateral box units, each of said box units having a bottom wall, a front end wall, a rear end wall, two opposing lateral side walls, and adjacent surfaces of complementary shape so that the work-box in a closed state forms an essentially solid block, and b) guide means arranged between said central box unit and said lateral box units, respectively, wherein c) said bottom wall of said central box unit comprises downwardly inclined, slanted wall portions, thus providing a contour of said central box unit that essentially corresponds to a triangular prism, said central box unit being open in upward direction and a lower edge defined by said slanted wall portions of its bottom wall facing in a downward direction, and d) upper edges of said front end, said rear end, and said side walls of said lateral box units defining a plane being parallel to said slanted wall portions of said central box unit.

2. A work-box according to claim 1, wherein said lateral box units are of greater height than said central box unit, so that inward lateral side walls of said opposing lateral side walls of said lateral box units are in direct opposition in a closed state of the work-box.

3. A work-box according to claim 2, wherein said guide means comprise linear guide means running parallel to said slanted wall portions of said central box unit.

4. A work-box according to claim 3, wherein said guide means each include co-operating guide elements provided on said central box unit and said lateral box units in the vicinity of slanted edges of their front end walls and rear end walls, respectively.

5. A work-box according to claim 4, wherein one of said co-operating guide elements is formed as an L-shaped profile, and the other of said guide elements is formed as a U-shaped profile.

6. A work-box according to claim 5, wherein said front end walls and rear end walls of said central box unit and said lateral box units extend in spaced parallel relationship, and said L-shaped profile forms a forward extension of the front and rear end walls of one of said adjacent box units, and said U-shaped profile forms an extension of the front and rear end walls of the other of said adjacent box units.

7. A work-box according to claim 1, wherein said central box unit and said two lateral box units are symmetric with respect to a mid plane of the work-box.

8. A work-box according to claim 1, wherein said central box unit has a center of gravity and comprises a handle attached to said central box unit and located in a region of said center of gravity.

9. A work-box according to claim 1, wherein hinge means are connected to an upper portion of exterior lateral walls of said opposing lateral side walls of said lateral box-units, respectively, each hinge means carrying a lateral portion of a lid member.

10. A work-box according to claim 9, wherein inward lateral edges of said lid members are formed with a depending latch rib co-operating with latch notches formed in said front end wall and said rear end wall of said central box unit to lock said lateral box units against movement in lateral direction.

11. A work-box according to claim 9, wherein inward lateral portions of said lid members co-operate to define an opening for receiving a handle projecting from said central box unit in an upward direction.

12. A work-box according to claim 11, wherein said lid members each are formed with a depression adjacent to said handle-receiving opening.

13. A work-box according to claim 12, wherein said lateral box units co-operate to define a recess adapted to receive an upwardly projecting handle of a further work-box, upon which the work-box is stackable.

14. A work-box according to claim 1, wherein at least one longitudinal vertical separating wall is provided in said central box unit.

15. A work-box according to claim 1, wherein at least one transverse vertical separating wall is provided in said central box unit.

16. A work-box according to claim 1, wherein each of said lateral box units is formed with grip means.

17. A work-box according to claim 10, wherein said grip means are formed by depressions formed in exterior lateral walls of said lateral box units.

* * * * *